(12) United States Patent
Schindler

(10) Patent No.: US 10,612,648 B2
(45) Date of Patent: Apr. 7, 2020

(54) HYDRAULIC SYSTEM FOR A MOTOR VEHICLE TRANSMISSION

(71) Applicant: Daimler AG, Stuttgart (DE)

(72) Inventor: Joerg Schindler, Bietigheim-Bissingen (DE)

(73) Assignee: Daimler AG, Stuttgart (DE)

( * ) Notice: Subject to any disclaimer, the term of this patent is extended or adjusted under 35 U.S.C. 154(b) by 470 days.

(21) Appl. No.: 15/537,258

(22) PCT Filed: Nov. 27, 2015

(86) PCT No.: PCT/EP2015/002393
§ 371 (c)(1),
(2) Date: Jun. 16, 2017

(87) PCT Pub. No.: WO2016/096092
PCT Pub. Date: Jun. 23, 2016

(65) Prior Publication Data
US 2018/0045303 A1     Feb. 15, 2018

(30) Foreign Application Priority Data
Dec. 18, 2014    (DE) .......................... 10 2014 019 010

(51) Int. Cl.
*F16H 61/02* (2006.01)
*F16H 61/34* (2006.01)
*F16H 61/688* (2006.01)
*F16H 61/30* (2006.01)
(Continued)

(52) U.S. Cl.
CPC .......... *F16H 61/0206* (2013.01); *F15B 11/17* (2013.01); *F16H 61/0031* (2013.01);
(Continued)

(58) Field of Classification Search
CPC . F16H 61/0206; F16H 61/3483; F16H 61/688
(Continued)

(56) References Cited

U.S. PATENT DOCUMENTS 8,429,994 B2    4/2013   Lundberg et al.
8,904,893 B2 * 12/2014   Moorman ........... F16H 61/0206
                                                                                               192/3.58
(Continued)

FOREIGN PATENT DOCUMENTS

DE    10 2005 058 779 A1    6/2007
DE    10 2009 005 755 A1    7/2010
(Continued)

OTHER PUBLICATIONS

PCT/EP2015/002393, International Search Report dated Feb. 29, 2016 (Three (3) pages).
(Continued)

*Primary Examiner* — Ha Dinh Ho
(74) *Attorney, Agent, or Firm* — Crowell & Moring LLP

(57) ABSTRACT

The transmission includes at least ten gear-selection pressure chambers which are provided for the selection of a plurality of transmission gears, at least two actuation valves, each of which is provided for setting at least one actuation pressure for the gear-selection pressure chambers, at least one first selection valve unit, at least one second selection valve unit, and at least one third selection valve unit which are provided for connecting the actuation valves to the gear-selection pressure chambers. The second selection valve unit is directly connected to four gear-selection pressure chambers in order to transmit actuation pressure and the third selection valve unit is directly connected to six other gear-selection pressure chambers and directly to the second selection valve unit in order to transmit actuation pressure.

12 Claims, 2 Drawing Sheets

(51) Int. Cl.
    *F15B 11/17*     (2006.01)
    *F16H 61/00*     (2006.01)
    *F16H 63/34*     (2006.01)
    *F16H 61/682*     (2006.01)

(52) U.S. Cl.
    CPC ......... F16H 61/30 (2013.01); F16H 63/3483 (2013.01); *F15B 2211/20576* (2013.01); *F15B 2211/7053* (2013.01); *F15B 2211/71* (2013.01); *F16H 61/682* (2013.01); *F16H 61/688* (2013.01)

(58) Field of Classification Search
    USPC .......................................................... 74/335
    See application file for complete search history.

(56) References Cited

U.S. PATENT DOCUMENTS

| | | | | |
|---|---|---|---|---|
| 2005/0107214 | A1* | 5/2005 | Koenig | F16H 61/12 477/174 |
| 2008/0176700 | A1* | 7/2008 | Long | F16H 61/12 475/116 |
| 2008/0210032 | A1* | 9/2008 | Uberti | F16H 61/2807 74/335 |
| 2009/0157271 | A1* | 6/2009 | Garabello | F16H 61/2807 701/55 |
| 2011/0028271 | A1 | 2/2011 | Whitmarsh et al. | |

FOREIGN PATENT DOCUMENTS

| | | |
|---|---|---|
| DE | 10 2010 035 930 A1 | 4/2011 |
| EP | 1 420 185 A2 | 5/2004 |
| EP | 1 710 477 A1 | 10/2006 |
| GB | 2468867 A | 9/2010 |
| WO | WO 2008/055464 A2 | 5/2008 |

OTHER PUBLICATIONS

German Search Report Issued in German counterpart application No. 10 2014 019 010.2 dated Oct. 19, 2015 (Eleven (11) pages).

* cited by examiner

HYDRAULIC SYSTEM FOR A MOTOR VEHICLE TRANSMISSION

BACKGROUND AND SUMMARY OF THE INVENTION

The invention relates to a hydraulic system for a motor vehicle transmission.

A hydraulic system for a motor vehicle transmission, with a plurality of gear-selection pressure chambers, which are provided for the selection of a plurality of transmission gears, is already known from EP 1 420 185 A2.

A hydraulic system which has 5 double-acting cylinders with 10 gear-selection pressure chambers is known from DE 10 2005 058 779 A1. However, in that document the supply of switching pressure to the 5 cylinders as well as the control of the hydraulic system is provided in a costly manner.

The object of the invention is, in particular, to simplify the hydraulic system and to improve the controllability.

The hydraulic system for a motor vehicle transmission has at least ten gear-selection pressure chambers, which are provided for the selection of a plurality of transmission gears; it also has at least two actuation valves, each of which is provided for setting at least one actuation pressure for the gear-selection pressure chambers; it also has at least one first selection valve unit, at least one second selection valve unit, and at least one third selection valve unit, which are provided for connecting the actuation valves to the gear-selection pressure chambers.

According to the invention the second selection valve unit is directly connected to four gear-selection pressure chambers in order to transmit actuation pressure and the third selection valve unit is directly connected to 6 other gear-selection pressure chambers and directly to the second selection valve unit in order to transmit actuation pressure.

In this way, only two selection valve units are directly connected to 10 gear-selection pressure chambers, so that an efficient and cost-effective hydraulic system design is produced.

An advantageous further embodiment of the invention is characterized in that the third selection valve unit has a first and a second selection valve, wherein the second selection valve hydraulically connects the first selection valve unit as required to two of the gear-selection pressure chambers or to the second selection valve unit.

In a further advantageous modification, a hydraulic system for a motor vehicle transmission is proposed, with at least ten gear-selection pressure chambers which are provided for the selection of a plurality of transmission gears, with at least two actuation valves, each of which is provided for setting at least one actuation pressure for the gear-selection pressure chambers, with at least one first selection valve unit, at least one second selection valve unit, and at least one third selection valve unit, which are provided for connecting the actuation valves to the gear-selection pressure chambers, wherein at least the first selection valve unit and the second selection valve unit have different switching pressure thresholds, as well as with at least one first control valve, which is connected in control terms at least to the first selection valve unit and the second selection valve unit and which is provided in order to set at least two control pressures which are different from one another for at least partially separate selection of the first selection valve unit and the second selection valve unit, and with at least one second control valve, which is connected in control terms at least to the third selection valve unit and which is provided in order to set at least one control pressure for switching of the third selection valve unit. Due to such a configuration of the hydraulic system, with a particularly low number of valves a particularly high number of transmission gears can be switched, so that a particularly compact, lightweight and/or cost-effective hydraulic system can be provided for selection of a high number of transmission gears. In particular, a particularly compact, lightweight and/or cost-effective hydraulic system can be provided, by means of which more than seven forward transmission gears can be switched. In this way, the hydraulic system can be improved, in particular, with regard to a number of switchable transmission gears to save on installation space, weight and/or costs.

The selection valve units are preferably provided in order to guide the actuation pressure set by at least one of the actuation valves to the corresponding gear-selection pressure chamber. The selection valve units preferably only have purely hydraulic switching sliders. A "selection valve unit" should be understood in particular to mean a unit which has at least one selection valve, wherein the unit can also have a plurality of selection valves for reasons of production and/or installation space. If a selection valve unit has only one selection valve, this selection valve unit is preferably formed by the selection valve. If a selection valve unit has a plurality of, in particular two, selection valves, this selection valve unit is preferably formed by the plurality of, in particular by the two selection valves, wherein it is conceivable in principle to represent the function of the plurality of, in particular, the two selection valves by one single selection valve. Advantageously, the first selection valve unit only has one single selection valve, the second selection valve unit only has one single selection valve and the third selection valve unit only has two selection valves. A "switching pressure threshold" should in particular be understood to mean a control pressure threshold of a valve or a valve unit so that, at a control pressure above the control pressure threshold, the valve or the valve unit is switched in its switching position and at a control pressure below the control pressure threshold the valve or the valve unit is switched in its normal position. The switching pressure threshold is preferably defined or set by at least one spring and/or by at least one control pressure surface, on which the control pressure acts, of the corresponding valve or the corresponding valve unit. The control pressure set by the first control valve preferably acts simultaneously as control pressure for the first selection valve unit and as control pressure for the second selection valve unit. A "normal position" should be understood in particular as a valve position of a valve or a valve unit, which position is adopted by the valve or the valve unit without application of a control pressure, so that the valve preferably also adopts the normal position when the internal combustion engine of the motor vehicle having the motor vehicle transmission is stationary. The actuation valves and/or the control valves are preferably electrical controllable. "Provided" should be understood in particular to mean specially constructed, designed, equipped and/or arranged.

Furthermore, it is proposed that the first selection valve unit is provided in order to connect both actuation valves to the third selection valve unit, so that already a transmission of the actuation pressure to the third selection valve unit between at least two connecting paths can be distinguished. The actuation valves can preferably be connected only via the first selection valve unit to the third selection valve unit. Advantageously the actuation pressure set by the actuation valves can be directed only via the first selection valve unit to the third selection valve unit.

Furthermore, it is proposed that the third selection valve unit is provided in order to connect the first actuation valve unit to the second selection valve unit, so that without an additional valve the number of selectable connection paths for the actuation pressure set by the actuation valves can be increased. The first selection valve unit can preferably be connected only via the third selection valve unit to the second selection valve unit. Advantageously the actuation pressure transmitted by the first selection valve unit can be directed only via the third selection valve unit to the second selection valve unit.

In particular, it is advantageous if the third selection valve unit is provided in order to connect the first selection valve unit to at least one of the gear-selection pressure chambers, so that the actuation valves can be connected to the gear-selection pressure chambers according to the transmission gear to be switched. The first selection valve unit is preferably provided in order to connect the first selection valve unit to at least one gear-selection pressure chamber and to the second selection valve unit. The second selection valve unit and the third selection valve unit are preferably arranged in flow terms between the gear-selection pressure chambers and the first selection valve unit. The second selection valve unit is preferably provided in order to transmit the actuation pressure transmitted by the first selection valve unit and the third selection valve unit to at least one of the gear-selection pressure chambers. The actuation pressure transmitted by the first selection valve unit can either be directed via the third selection valve unit to at least one gear-selection pressure chamber or can be directed via the third selection valve unit and the second selection valve unit to at least one gear-selection pressure chamber. The second selection valve unit and the third selection valve unit are preferably provided in order to transmit the actuation pressure transmitted by the first selection valve unit to the corresponding gear-selection pressure chamber. The second selection valve unit is preferably provided in order to supply four of the gear-selection pressure chambers with the actuation pressure transmitted by the first selection valve unit and the third selection valve unit. The third selection valve unit is preferably provided in order to supply six of the gear-selection pressure chambers with the actuation pressure transmitted by the first selection valve unit.

Furthermore, it is advantageous if the switching pressure threshold of the second selection valve unit is greater than the switching pressure threshold of the first selection valve unit, so that an advantageous state can be produced in which the first selection valve unit is switched in its switching position and the second selection valve unit is switched in its normal position.

In an advantageous design the hydraulic system has at least one further valve with a switching pressure threshold which differs from the third selection valve unit, wherein the second control valve is connected in control terms to the at least one further valve and is provided in order to set at least two control pressures which are different from one another for at least partially separate switching of the third selection valve unit and the further valve. As a result, the second control valve can be used additionally for controlling the third selection valve unit for controlling the at least one further valve, so that at least one further unit of the hydraulic system can be actuated in particular to save on weight, installation space and/or costs. The control pressure set by the second control valve preferably acts simultaneously as control pressure for the third selection valve unit and as control pressure for the at least one further valve. The two control valves are advantageously provided in each case to control two valves, in particular as they are each provided in order to set two different control pressures.

Furthermore, it is proposed that the switching pressure threshold of the further valve is greater than the switching pressure threshold of the third selection valve unit, so that an advantageous state can be produced in which the third selection valve unit is switched in its switching position and the second selection valve unit is switched in its normal position.

Furthermore, it is proposed that the further valve is provided for controlling a parking lock, so that by means of the three selection valve units and the two control valves an actuation pressure supply of the at least ten gear-selection pressure chambers and actuation of the parking brake can be controlled.

In particular, it is advantageous if the hydraulic system has at least five double-acting gear selectors, which each have two of the gear-selection pressure chambers, so that the hydraulic system can be further improved with regard to its installation space requirement, its weight and/or its costs. A "double-acting gear selector" should be understood in particular to be a gear selector which has an actuating cylinder and an actuating piston arranged displaceably in the actuating cylinder, wherein the actuating cylinder and the actuating piston enclose two gear-selection pressure chambers acting in opposite directions, so that the actuating piston can be moved in a first switching direction by an actuation pressure in the first gear-selection pressure chamber and can be moved in a second switching direction by an actuation pressure in the second gear-selection pressure chamber. The selection valve units are advantageously provided in order to connect the first actuation valve in each case to one of the two gear-selection pressure chambers of the double-acting gear selectors and to connect the second actuation valve in each case to the other one of the two gear-selection pressure chambers of the double-acting gear selectors.

Furthermore, it is advantageous if the gear-selection pressure chambers are divided into first gear-selection pressure chambers of the gear selectors and into second gear-selection pressure chambers of the gear selectors and the selection valve units are provided in order to connect the first actuation valve to the first gear-selection pressure chambers and to connect the second actuation valve to the second gear-selection pressure chambers. In this way, the control of the actuation pressure supply of the ten gear-selection pressure chambers can be simplified.

Further advantages can be seen from the following description of the drawings. An exemplary embodiment of the invention is shown in the drawings. The drawings, the description of the drawings and the claims contain numerous features in combination. The person skilled in the art will also advantageously consider the features individually and will combine them to form further meaningful combinations.

DETAILED DESCRIPTION OF THE DRAWINGS

Figure 1:
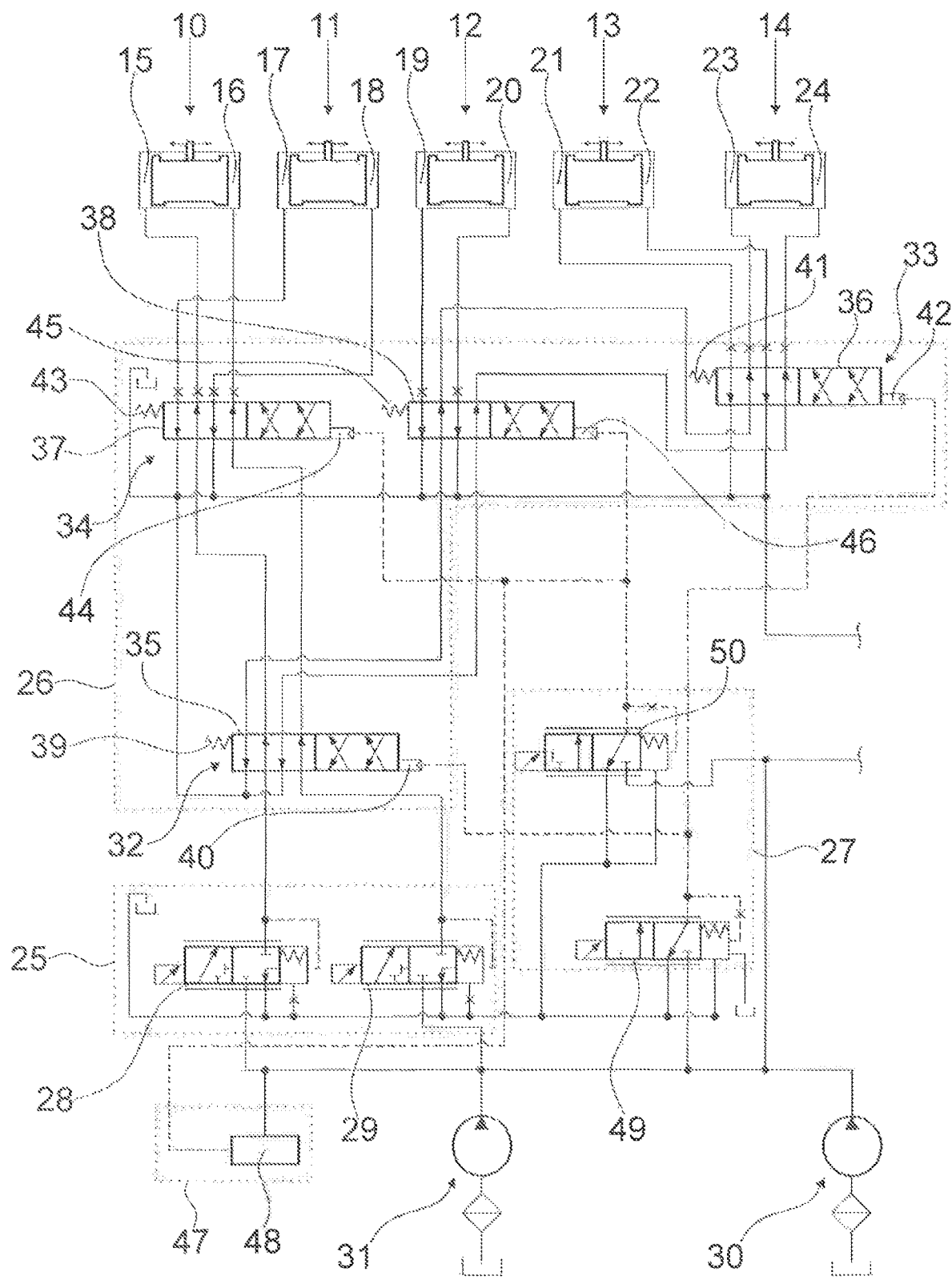
FIG. 1 shows a hydraulic system of a motor vehicle transmission.

A hydraulic system of a motor vehicle transmission is shown in FIG. 1. The motor vehicle transmission is designed as a dual clutch transmission. It is provided for the selection of a plurality of in particular at least nine, forward transmission gears and at least one reverse transmission gear envisaged. For selection of the transmission gears the hydraulic system has five double-acting gear selectors 10, 11, 12, 13, 14. The gear selectors 10, 11, 12, 13, 14 each have a switching element which can be moved hydraulically. The switching element is designed as a sliding sleeve. Furthermore, the gear selectors 10, 11, 12, 13, 14 each have a selector fork which is connected to the respective sliding sleeve, moves with the sliding sleeve and engages the respective transmission gear.

The gear selectors 10, 11, 12, 13, 14 each have two gear-selection pressure chambers 15, 16, 17, 18, 19, 20, 21, 22, 23, 24 which act in opposite directions to one another. The hydraulic system has ten gear-selection pressure chambers 15-24 for selection of the transmission gears. The first gear selector 10 comprises the two gear-selection pressure chambers 15, 16, the second gear selector 11 comprises the two gear-selection pressure chambers 17, 18, the third gear selector 12 comprises the two gear-selection pressure chambers 19, 20, the fourth gear selector 13 comprises the two gear-selection pressure chambers 21, 22 and the fifth gear selector 14 comprises the two gear-selection pressure chambers 23, 24. The gear-selection pressure chambers 15-24 are divided into first gear-selection pressure chambers 15, 17, 19, 21, 23 of the gear selectors 10, 11, 12, 13, 14 and into second gear-selection pressure chambers 16, 18, 20, 22, 24 of the gear selectors 10, 11, 12, 13, 14.

For conveying of an actuating medium for actuation of the transmission gears 10, 11, 12, 13, 14 the hydraulic system has a first operating medium pump 30. The first operating medium pump 30 is connected in drive terms to an internal combustion engine of a motor vehicle having the motor vehicle transmission. The internal combustion engine drives the first operating medium pump 30. The first operating medium pump 30 is designed as a main pump. The hydraulic system also has a second operating medium pump 31, which is provided in order to assist the first operating medium pump 30 or to replace it in specific operating states. The second operating medium pump 31 has an electric drive. The second operating medium pump 31 is designed as an electric auxiliary pump. The actuating medium is in the form of oil. In principle, it is also possible to dispense with the second operating medium pump 31.

The hydraulic system also has a parking brake device 47, which is provided for locking a motor vehicle drive train having the motor vehicle transmission. The parking lock device 47 is shown in highly simplified form for the sake of clarity. The parking lock device 47 has a valve 48 for actuation of a parking lock piston. The valve 48 is provided for controlling a parking lock. It is provided in order to direct the actuating medium conveyed by at least one of the operating medium pumps 30, 31 to a pressure chamber of a parking lock actuating unit (not shown) of the parking lock device 47. The valve 48 has an inlet which is connected hydraulically to the operating medium pumps 30, 31. The valve 48 is designed as a parking lock valve. It is designed as switching slider.

Figure 2:
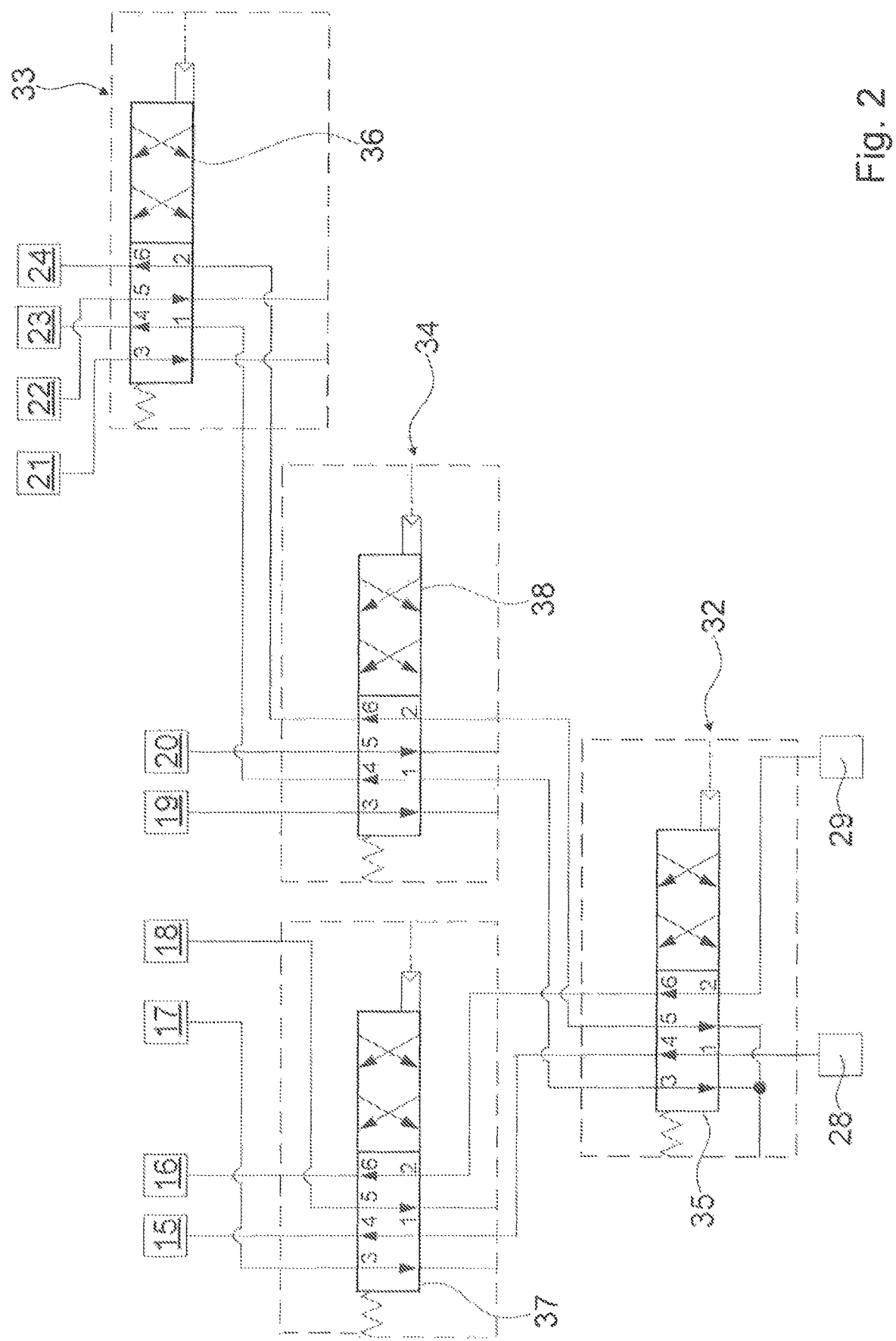
FIG. 2 shows a part of the hydraulic system on an enlarged scale.

For electrohydraulic control of the five gear selectors 10, 11, 12, 13, 14 the hydraulic system has an actuation valve arrangement 25, a selection valve arrangement 26 and a control valve arrangement 27. The actuation valve arrangement 25 is provided in order to set at least one actuation pressure for the gear-selection pressure chambers 15-24. The selection valve arrangement 26 is provided in order to connect the actuation valve arrangement 25 to the gear-selection pressure chambers 15-24 according to a transmission gear to be switched. It is provided in order to direct the actuation pressure to the corresponding gear-selection pressure chamber 15-24. The selection valve arrangement 26 is arranged fluidically between the gear-selection pressure chambers 15-24 and the actuation valve arrangement 25. The selection valve arrangement 26 is shown in FIG. 2 with its connection to the gear selectors 10, 11, 12, 13, 14 and the actuation valve arrangement 25 on an enlarged scale. The control valve arrangement 27 is provided in order to connect the selection valve arrangement 26 according to the transmission gear to be switched.

The actuation valve arrangement 25 has a first actuation valve 28 and a second actuation valve 29 each of which is provided for setting the actuation pressure for the gear-selection pressure chambers 15-24. The two actuation valves 28, 29 are arranged parallel to one another in terms of flow. The actuation valves 28, 29 are in each case connected on the inlet side to the operating medium pumps 30, 31 and on the outlet side to the selection valve arrangement 26. The two actuation valves 28, 29 are in each case electrically controllable for setting the actuation pressure. The actuation valves 28, 29 are in each case designed as a regulating solenoid valve. They are each designed as a proportional pressure control valve.

The selection valve arrangement 26 has a first selection valve unit 32, a second selection valve unit 33 and a third selection valve unit 34, which are provided for connecting the actuation valves 28, 29 to the gear-selection pressure chambers (15-24) according to the transmission gear to be switched. The selection valve units 32, 33, 34 are provided for selectively connecting the first actuation valve 28 to the first gear-selection pressure chambers 15, 17, 19, 21, 23 and the second actuation valve 29 to the second gear-selection pressure chambers 16, 18, 20, 22, 24.

The first selection valve unit 32 has only one single selection valve 35. The first selection valve unit 32 is formed by the selection valve 35. The second selection valve unit 33 has only one single selection valve 36. The second selection valve unit 33 is formed by the selection valve 36. The third selection valve unit 34 has only one first selection valve 37 and one second selection valve 38. The third selection valve unit 34 is formed by the selection valve 37 and the selection valve 38. The selection valves 35, 36, 37, 38 are in each case designed as a purely hydraulic switching slider. The selection valves 35, 36, 37, 38 each have eight connections and two valve positions. In principle, the selection valves 37, 38 of the third selection valve unit 34 can be combined to form one single selection valve, so that the third selection valve unit 34 likewise has only one single selection valve which performs the function of the two selection valves 37, 38.

The first selection valve unit 32 hydraulically connects the two actuation valves 28, 29 permanently to the third selection valve unit 34. In all its valve positions the first selection valve unit 32 connects the two actuation valves 28, 29 to the third selection valve unit 34. Depending upon its valve position the first selection valve unit 32 connects the two actuation valves 28, 29 either to the first selection valve 38 of the third selection valve unit 34 or to the second selection valve 38 of the third selection valve unit 34.

The first selection valve unit 32 comprises a first inlet 35.1, which is connected to the first actuation valve 28, and a second input 35.2, which is connected to the second actuation valve 29. The first selection valve unit 32 comprises a first outlet 35.4 and a second outlet 35.3 which can be selectively connected to the first inlet 35.1 of the first selection valve unit 32, and also comprises a third outlet 35.6 and a fourth outlet 35.5 which can be selectively connected to the second inlet 35.2 of the first selection valve unit 32. The first outlet 35.4 and the third outlet 35.6 of the first selection valve unit 32 are hydraulically connected to the first selection valve 37 of the third selection valve unit 34. The second outlet 35.3 and the fourth outlet 35.5 of the first selection valve unit 32 are hydraulically connected to the second selection valve 38 of the third selection valve unit 34.

The first selection valve unit 32 has two valve positions. In its first valve position the first selection valve unit 32 connects the two actuation valves 28, 29 to the first selection valve 37 of the third selection valve unit 34. In the first valve position of the first selection valve unit 32 the first inlet 35.1 is connected to the first outlet 35.4 and the second inlet 35.2 is connected to the third outlet 35.6. In its first valve position the first selection valve unit 32 transmits the actuation pressure set by the actuation valves 28, 29 to the first selection valve 37 of the third selection valve unit 34. In its second valve position the first selection valve unit 32 connects the two actuation valves 28, 29 to the second selection valve 38 of the third selection valve unit 34. In the second valve position of the first selection valve unit 32 the first inlet 35.1 is connected to the second outlet 35.3 and the second inlet 35.2 is connected to the fourth outlet 35.5. In its second valve position the first selection valve unit 32 transmits the actuation pressure set by the actuation valves 28, 29 to the second selection valve 38 of the third selection valve unit 34.

For setting the first valve position the first selection valve unit 32 has a spring 39. For setting the second valve position the first selection valve unit 32 has a control pressure chamber 40. A spring force of the spring 39 and a switching force which can be generated by a control pressure in the control pressure chamber 40 counteract one another. The first valve position of the first selection valve unit 32 is designed as a normal position. The second valve position of the first selection valve unit 32 is designed as a switching position.

The second selection valve unit 33 hydraulically connects the third selection valve unit 34 permanently to two of the gear-selection pressure chambers 21, 22, 23, 24. It connects the second selection valve 38 of the selection valve unit 34 permanently to two of the gear-selection pressure chambers 21, 22, 23, 24. The second selection valve unit 33 connects the third selection valve unit 34 in all of its valve positions to two of the gear-selection pressure chambers 21, 22, 23, 24. It connects the second selection valve 38 of the third selection valve unit 34 in all of its valve positions to two of the gear-selection pressure chambers 21, 22, 23, 24. The second selection valve unit 33 is provided for alternating between the connection of the third selection valve unit 34 to the fourth gear selector 13 and the connection of the third selection valve unit 34 to the fifth gear selector 14. Depending upon its valve position the second selection valve unit 33 connects the third selection valve unit 34 either to the two gear-selection pressure chambers 21, 22 of the fourth gear selector 13 or to the two gear-selection pressure chambers 23, 24 of the fifth gear selector 14. Depending upon its valve position it connects the second selection valve 38 of the third selection valve unit 34 either to the two gear-selection pressure chambers 21, 22 of the fourth gear selector 13 or to the two gear-selection pressure chambers 23, 24 of the fifth gear selector 14.

The second selection valve unit 33 has a first inlet 36.1 and a second inlet 36.2, which are connected to the second selection valve 38 of the third selection valve unit 34. The first inlet 36.1 of the second selection valve unit 33 can be connected hydraulically via the third selection valve unit 34 and the first selection valve unit 32 to the first actuation valve 28. The second inlet 36.2 of the second selection valve unit 33 can be connected hydraulically via the third selection valve unit 34 and the first selection valve unit 32 to the second actuation valve 29. The second selection valve unit 33 comprises a first outlet 36.4 and a second outlet 36.3 which can be selectively connected to the first inlet 36.1 of the second selection valve unit 33, and also comprises a third outlet 36.6 and a fourth outlet 36.5 which can be selectively connected to the second inlet 36.2 of the second selection valve unit 33. The first outlet 36.4 and the third outlet 36.6 of the second selection valve unit 33 are hydraulically connected to the fifth gear selector 14. The first outlet 36.4 of the second selection valve unit 33 is connected to the first gear-selection pressure chamber 23 of the fifth gear selector 14. The third outlet 36.6 of the second selection valve unit 33 is connected to the second gear-selection pressure chamber 24 of the fifth gear selector 14. The second outlet 36.3 and the fourth outlet 36.5 of the second selection valve unit 33 are hydraulically connected to the fourth gear selector 13. The second outlet 36.3 of the second selection valve unit 33 is connected to the first gear-selection pressure chamber 21 of the fourth gear selector 13. The fourth outlet 36.5 of the second selection valve unit 33 is connected to the second gear-selection pressure chamber 22 of the fourth gear selector 13.

The second selection valve unit 33 has two valve positions. In its first valve position the second selection valve unit 33 connects the third selection valve unit 34 to the two gear-selection pressure chambers 23, 24 of the fifth gear selector 14. In its first valve position the second selection valve unit 33 connects the second selection valve 38 of the third selection valve unit 34 to the two gear-selection pressure chambers 23, 24 of the fifth gear selector 14. In the first valve position of the second selection valve unit 33 the first inlet 36.1 is connected to the first outlet 36.4 and the second inlet 36.2 is connected to the third outlet 36.6. In its first valve position the second selection valve unit 33 transmits an actuation pressure transmitted by the second selection valve 38 of the third selection valve unit 34 to the fifth gear selector 14. In its second valve position the second selection valve unit 33 connects the third selection valve unit 34 to the two gear-selection pressure chambers 21, 22 of the fourth gear selector 13. In its second valve position the second selection valve unit 33 connects the second selection valve 38 of the third selection valve unit 34 to the two gear-selection pressure chambers 21, 22 of the fourth gear selector 13. In the second valve position of the second selection valve unit 33 the first inlet 36.1 is connected to the second outlet 36.3 and the second inlet 36.2 is connected to the fourth outlet 36.5. In its second valve position the second selection valve unit 33 transmits the actuation pressure transmitted by the second selection valve 38 of the third selection valve unit 13 to the fourth gear selector 13.

For setting the first valve position the second selection valve unit 33 has a spring 41. For setting the second valve position the second selection valve unit 33 has a control pressure chamber 42. A spring force of the spring 41 and a switching force which can be generated by a control pressure in the control pressure chamber 42 counteract one another. The first valve position of the second selection valve unit 33 is designed as a normal position. The second valve position of the second selection valve unit 33 is designed as a switching position.

The first selection valve unit 32 and the second selection valve unit 33 have switching pressure thresholds which differ from one another. The switching pressure threshold of the first selection valve unit 32 differs from the switching pressure threshold of the second selection valve unit 33. The switching pressure threshold of the second selection valve unit 33 is greater than the switching pressure threshold of the first selection valve unit 32. By comparison with the second selection valve unit 33, the first selection valve unit 32 switches at a lower control pressure into the second valve position. The spring 41 of the second selection valve unit 33 has a greater spring pre-tensioning than the spring 39 of the first selection valve unit 32.

The third selection valve unit 34 is provided for connecting the first selection valve unit 32 to three of the gear selectors 10, 11, 12 and to the second selection valve unit 33. The first selection valve 37 of the third selection valve unit 34 hydraulically connects the first selection valve unit 32 permanently to two of the gear-selection pressure chambers 15, 16, 17, 18. The first selection valve 37 of the third selection valve unit 34 in all of its valve positions connects the first selection valve unit 32 to two of the gear-selection pressure chambers 15, 16, 17, 18. The first selection valve 37 of the third selection valve unit 34 is provided for alternating between the connection of the first selection valve unit 32 to the first gear selector 10 and the connection of the first selection valve unit 32 to the second gear selector 11. Depending upon its valve position the first selection valve 37 of the third selection valve unit 34 connects the first selection valve unit 32 either to the two gear-selection pressure chambers 15, 16 of the first gear selector 10 or to the two gear-selection pressure chambers 17, 18 of the second gear selector 11.

The first selection valve 37 of the selection valve unit 34 has a first inlet 37.1 and a second inlet 37.2, which are connected to the first selection valve unit 32. The first inlet 37.1 of the first selection valve 37 can be connected hydraulically via the first selection valve unit 32 to the first actuation valve 28. The second inlet 37.2 of the first selection valve 37 can be connected hydraulically via the first selection valve unit 32 to the second actuation valve 29. The first inlet 37.1 of the first selection valve 37 can be connected hydraulically to the first outlet 35.4 of the first selection valve unit 32. The first inlet 37.2 of the first selection valve 37 can be connected hydraulically to the third outlet 35.6 of the first selection valve unit 32. The first selection valve 37 of the third selection valve unit 34 comprises a first outlet 37.4 and a second outlet 37.3 which can be selectively connected to the first inlet 37.1 of the first selection valve unit 37, and also comprises a third outlet 37.6 and a fourth outlet 37.5 which can be selectively connected to the second inlet 37.2 of the first selection valve 37. The first outlet 37.4 and the third outlet 37.6 of the first selection valve 37 are hydraulically connected to the first gear selector 10. The first outlet 37.4 of the first selection valve 37 is connected to the first gear-selection pressure chamber 15 of the first gear selector 10. The third outlet 37.6 of the first selection valve 37 is connected to the second gear-selection pressure chamber 16 of the first gear selector 10. The second outlet 37.3 and the fourth outlet 37.5 of the first selection valve 37 are hydraulically connected to the second gear selector 11. The second outlet 37.3 of the first selection valve 37 is connected to the first gear-selection pressure chamber 17 of the second gear selector 11. The fourth outlet 37.5 of the first selection valve 37 is connected to the second gear-selection pressure chamber 18 of the second gear selector 11.

The first selection valve 37 of the third selection valve unit 34 has two valve positions. In its first valve position the first selection valve 37 of the third selection valve unit 34 connects the first selection valve unit 32 to the two gear-selection pressure chambers 15, 16 of the first gear selector 10. In the first valve position of the first selection valve 37 the first inlet 37.1 is connected to the first outlet 37.4 and the second inlet 37.2 is connected to the third outlet 37.6. In its first valve position the first selection valve 37 of the third selection valve unit 34 transmits an actuation pressure transmitted by the first selection valve 32 to the first gear selector 10. In its second valve position the first selection valve 37 of the third selection valve unit 34 connects the first selection valve unit 32 to the two gear-selection pressure chambers 17, 18 of the second gear selector 11. In the second valve position of the first selection valve 37 the first inlet 37.1 is connected to the second outlet 37.3 and the second inlet 37.2 is connected to the fourth outlet 37.5. In its second valve position the first selection valve 37 of the third selection valve unit 34 transmits the actuation pressure transmitted by the first selection valve 32 to the second gear selector 11.

For setting the first valve position the first selection valve 37 of the third selection valve unit 34 has a spring 43. For setting the second valve position the first selection valve 37 of the third selection valve unit 34 has a control pressure chamber 44. A spring force of the spring 43 and a switching force which can be generated by a control pressure in the control pressure chamber 44 counteract one another. The first valve position of the first selection valve 37 of the third selection valve unit 34 is designed as a normal position. The second valve position of the first selection valve 37 of the third selection valve unit 34 is designed as a switching position.

The second selection valve 38 of the third selection valve unit 34 hydraulically connects the first selection valve unit 32 selectively to two of the gear-selection pressure chambers 19, 20 or to the second selection valve unit 33. The second selection valve 38 of the third selection valve unit 34 is provided for alternating between the connection of the first selection valve unit 32 to one of the gear selectors 12 and the connection of the first selection valve unit 32 to the second selection valve unit 33. It is provided for alternating between the connection of the first selection valve unit 32 to the third gear selector 12 and the connection of the first selection valve unit 32 to the second selection valve unit 33. Depending upon its valve position the second selection valve 38 of the third selection valve unit 34 connects the first selection valve unit 32 either to the two gear-selection pressure chambers 19, 20 of the third gear selector 12 or to the second selection valve unit 33.

The second selection valve 38 of the third selection valve unit 34 has a first inlet 38.1 and a second inlet 38.2, which are connected to the first selection valve unit 32. The first inlet 38.1 of the second selection valve 38 can be connected hydraulically via the first selection valve unit 32 to the first actuation valve 28. The second inlet 38.2 of the second selection valve 38 can be connected hydraulically via the first selection valve unit 32 to the section actuation valve 29. The first inlet 38.1 of the second selection valve 38 can be connected hydraulically to the second outlet 35.3 of the first selection valve unit 32. The second inlet 38.2 of the second selection valve 38 can be connected hydraulically to the fourth outlet 35.5 of the first selection valve unit 32. The second selection valve 38 of the third selection valve unit 34 comprises a first outlet 38.4 and a second outlet 38.3 which can be selectively connected to the first inlet 38.1 of the second selection valve 38, and also comprises a third outlet 38.6 and a fourth outlet 38.5 which can be selectively connected to the second inlet 38.2 of the second selection valve 38. The first outlet 38.4 and the third outlet 38.6 of the second selection valve 38 are hydraulically connected to the second selection valve unit 33. The first outlet 38.4 of the second selection valve 38 is connected to the first outlet 36.1 of the second selection valve unit 33. The third outlet 38.6 of the second selection valve 38 is connected to the second inlet 36.2 of the second selection valve unit 33. The second outlet 38.3 and the fourth outlet 38.5 of the second selection valve 38 are hydraulically connected to the third gear selector 12. The second outlet 38.3 of the second selection valve 38 is connected to the first gear-selection pressure chamber 19 of the third gear selector 12. The fourth outlet 38.5 of the second selection valve 38 is connected to the second gear-selection pressure chamber 20 of the third gear selector 12.

The second selection valve 38 of the third selection valve unit 34 has two valve positions. In its first valve position the second selection valve 38 of the third selection valve unit 34 connects the first selection valve unit 32 to the second selection valve unit 32 to the second selection valve unit 33. In the first valve position of the second selection valve 38 the first inlet 38.1 is connected to the first outlet 38.4 and the second inlet 38.2 is connected to the third outlet 38.6. In its first valve position the second selection valve 38 of the third selection valve unit 34 transmits an actuation pressure transmitted by the first selection valve 32 to the second selection valve unit 33. In its second valve position the second selection valve 38 of the third selection valve unit 34 connects the first selection valve unit 32 to the two gear-selection pressure chambers 19, 20 of the third gear selector 12. In the second valve position of the first selection valve 38 the first inlet 38.1 is connected to the second outlet 38.3 and the second inlet 38.2 is connected to the fourth outlet 38.5 of the second selection valve 38. In its second valve position the second selection valve 38 of the third selection valve unit 34 transmits the actuation pressure transmitted by the first selection valve 32 to the third gear selector 12.

For setting the first valve position the second selection valve 38 of the third selection valve unit 34 has a spring 45. For setting the second valve position the second selection valve 38 of the third selection valve unit 34 has a control pressure chamber 46. A spring force of the spring 45 and a switching force which can be generated by a control pressure in the control pressure chamber 46 counteract one another. The first valve position of the second selection valve 38 of the third selection valve unit 34 is designed as a normal position. The second valve position of the second selection valve 38 of the third selection valve unit 34 is designed as a switching position.

The first selection valve 37 and the second selection valve 38 of the third selection valve unit 34 have identical switching pressure thresholds. The switching pressure threshold of the first selection valve 37 and the switching pressure threshold of the second selection valve 38 are the same. The selection valves 37, 38 switch simultaneously into the second valve position. The springs 43, 45 of the selection valves 37, 38 have the same spring pre-tension.

The selection valves 37, 38 of the third selection valve unit 34 and the valve 48 of the parking lock device 47 have different switching pressure thresholds from one another. The switching pressure threshold of the third selection valve unit 37 and thus of the two selection valves 37, 38 differs from the switching pressure threshold of the valve 48. The switching pressure threshold of the valve 48 is greater than the switching pressure threshold of the third selection valve unit 34. By comparison with the valve 48 of the parking lock device 47, the two selection valves 37, 38 of the third selection valve unit 34 switch at a lower control pressure into the second valve position. The springs 43, 45 of the selection valves 37, 38 have a lower spring pre-tension than a spring of the valve 48.

The two selection valves 37, 38 are only switchable together. They are both switched either in the first valve position or in the second valve position. In particular, it is not provided that the first selection valve 37 is switched in the first valve position and the second selection valve 38 is switched in the second valve position and vice versa. The third selection valve unit 34 has a first valve position and a second valve position. In its first valve position the third selection valve unit 34 connects the first selection valve unit 32 to the first gear selector 10 and to the second selection valve unit 33. In its second valve position the third selection valve unit 34 connects the first selection valve unit 32 to the second gear selector 11 and to the third selection valve unit 12.

In a state in which the first selection valve unit 32 and the selection valves 37, 38 are switched in the first valve position, the actuation pressure in the gear-selection pressure chamber 15 can be set by means of the first actuation valve 28 and the actuation pressure in the gear-selection pressure chamber 16 can be set by means of the second actuation valve 29.

In a state in which the first selection valve unit 32 is switched in the first valve position and the selection valves 37, 38 are switched in the second valve position, the actuation pressure in the gear-selection pressure chamber 17 can be set by means of the first actuation valve 28 and the actuation pressure in the gear-selection pressure chamber 18 can be set by means of the second actuation valve 29.

In a state in which the first selection valve unit 32 and the selection valves 37, 38 are switched in the second valve position, the actuation pressure in the gear-selection pressure chamber 19 can be set by means of the first actuation valve 28 and the actuation pressure in the gear-selection pressure chamber 20 can be set by means of the second actuation valve 29.

In a state in which the first selection valve unit 32 and the second selection valve unit 33 are switched in the second valve position and the selection valves 37, 38 are switched in the first valve position, the actuation pressure in the gear-selection pressure chamber 21 can be set by means of the first actuation valve 28 and the actuation pressure in the gear-selection pressure chamber 22 can be set by means of the second actuation valve 29.

In a state in which the first selection valve unit 32 and the selection valves 37, 38 are switched in the second valve position and the second selection valve unit 33 are switched in the first valve position, the actuation pressure in the gear-selection pressure chamber 23 can be set by means of the first actuation valve 28 and the actuation pressure in the gear-selection pressure chamber 24 can be set by means of the second actuation valve 29.

For setting of the states the control valve arrangement 27 has a first control valve 49 and a second control valve 50. The first control valve 49 is connected in flow terms to the first selection valve unit 32 and the second selection valve unit 33. The first control valve 49 has an outlet which is hydraulically connected permanently to the control pressure chamber 40 of the first selection valve unit 32 and hydraulically connected permanently to the control pressure chamber 42 of the second selection valve unit 33. On the inlet side the first control valve 49 is connected to the operating medium pumps 30, 31. The first control valve 49 is provided in order to set two control pressures which are different from one another for the two selection valve units 32, 33 for separate switching of the first selection valve unit 32 and the second selection valve unit 33. For switching of only the first selection valve unit 32 into its second valve position the first control valve 49 is provided for setting a first control pressure which is greater than the switching pressure threshold of the first selection valve unit 32 and is less than the switching pressure threshold of the second selection valve unit 33. For switching of the second selection valve unit 33 into its second valve position the first control valve 49 is provided for setting a second control pressure which is greater than the switching pressure threshold of the first selection valve unit 32 and is greater than the switching pressure threshold of the second selection valve unit 33. If the second selection valve unit 33 is switched in the second valve position, the first selection valve unit 32 is thus also switched in the second valve position. The first control valve 49 is electrically controllable for setting the control pressure. The first control valve 49 is designed as a regulating solenoid valve. It is designed as a proportional pressure control valve. In this exemplary embodiment, the first control pressure is 4 bars and the second control pressure is 8 bars.

The second control valve 50 is connected in flow terms to the third selection valve unit 34 and to the parking lock device 47. It is connected in flow terms to the first selection valve 37 of the third selection valve unit 34, to the second selection valve 38 of the third selection valve unit 34 and to the valve 48 of the parking lock device 47. The second control valve 50 has an outlet which is hydraulically connected permanently to the control pressure chamber 44 of the first selection valve 37, to the control pressure chamber 46 of the second selection valve 38 and to a control pressure chamber 48. On the inlet side the second control valve 50 is connected to the operating medium pumps 30, 31. The second control valve 50 is provided in order to set two control pressures which are different from one another for the third selection valve unit 34 and the valve 48 for separate switching of the third selection valve unit 34 and the valve 48. For switching of only the third selection valve unit 34 into its second valve position, the second control valve 50 is provided for setting a first control pressure which is greater than the switching pressure threshold of the third selection valve unit 34 and is less than a switching pressure threshold of the valve 48. The first control pressure is greater than the switching pressure thresholds of the selection valves 37, 38 of the third selection valve unit 34. For switching of the valve 48 of the parking lock device 47 into its second valve position the second control valve 50 is provided for setting a second control pressure which is greater than the switching pressure thresholds of the two selection valves 37, 38 of the third selection valve unit 34 and is greater than the switching pressure threshold of the valve 48 of the parking lock device 47. The second control valve 50 is electrically controllable for setting the control pressure. The second control valve 50 is designed as a regulating solenoid valve. It is designed as a proportional pressure control valve. In this exemplary embodiment, the first control pressure is 4 bars and the second control pressure is 8 bars.

LIST OF REFERENCE SIGNS

10 gear selector
11 gear selector
12 gear selector
13 gear selector
14 gear selector
15 gear-selection pressure chamber
16 gear-selection pressure chamber
17 gear-selection pressure chamber
18 gear-selection pressure chamber
19 gear-selection pressure chamber
20 gear-selection pressure chamber
21 gear-selection pressure chamber
22 gear-selection pressure chamber
23 gear-selection pressure chamber
24 gear-selection pressure chamber
25 actuation valve arrangement
26 selection valve arrangement
27 control valve arrangement
28 actuation valve
29 actuation valve
30 operating medium pump
31 operating medium pump
32 selection valve unit
33 selection valve unit
34 selection valve unit
35 selection valve
35.1 inlet
35.2 inlet
35.3 outlet
35.4 outlet
35.5 outlet
35.6 outlet
36 selection valve
36.1 inlet
36.2 inlet
36.3 outlet
36.4 outlet
36.5 outlet
36.6 outlet
37 selection valve
37.1 inlet
37.2 inlet
37.3 outlet
37.4 outlet
37.5 outlet
37.6 outlet
38 selection valve
38.1 inlet
38.2 inlet
38.3 outlet
38.4 outlet
38.5 outlet
38.6 outlet
39 spring
40 control pressure chamber
41 spring
42 control pressure chamber
43 spring
44 control pressure chamber
45 spring
46 control pressure chamber
47 parking lock device
48 valve
49 control valve
50 control valve

The invention claimed is:
1. A hydraulic system for a motor vehicle transmission, comprising:
ten gear-selection pressure chambers for selection of a plurality of transmission gears;
a first actuation valve and a second actuation valve, wherein each of the first and the second actuation valves set at least one actuation pressure for the ten gear-selection pressure chambers; and a first selection valve unit, a second selection valve unit, and a third selection valve unit which connect the first and the second actuation valves to the ten gear-selection pressure chambers;

wherein the second selection valve unit is directly connected to four of the ten gear-selection pressure chambers in order to transmit actuation pressure and wherein the third selection valve unit is directly connected to six other of the ten gear-selection pressure chambers and is directly connected to the second selection valve unit in order to transmit actuation pressure.

2. The hydraulic system according to claim 1, wherein the third selection valve unit has a first selection valve and a second selection valve, wherein the second selection valve hydraulically connects the first selection valve unit selectively to two of the ten gear-selection pressure chambers or to the second selection valve unit.

3. The hydraulic system according to claim 1 further comprising:

a first control valve which is connected in control terms at least to the first selection valve unit and the second selection valve unit and which sets at least two control pressures which are different from one another for at least partially separate selection of the first selection valve unit and the second selection valve unit; and a second control valve which is connected in control terms at least to the third selection valve unit and which sets at least one control pressure for switching of the third selection valve unit;

wherein the first selection valve unit and the second selection valve unit have different switching pressure thresholds.

4. The hydraulic system according to claim 1, wherein the first selection valve unit connects the first actuation valve and the second actuation valve to the third selection valve unit.

5. The hydraulic system according to claim 1, wherein the third selection valve unit connect the first selection valve unit to the second selection valve unit.

6. The hydraulic system according to claim 1, wherein the third selection valve unit connects the first selection valve unit to at least one of the ten gear-selection pressure chambers.

7. The hydraulic system according to claim 1, wherein a switching pressure threshold of the second selection valve unit is greater than a switching pressure threshold of the first selection valve unit.

8. The hydraulic system according to claim 3 further comprising a valve, wherein the second control valve is connected in control terms to the valve and sets at least two control pressures which are different from one another for at least partially separate switching of the third selection valve unit and the valve.

9. The hydraulic system according to claim 8, wherein a switching pressure threshold of the valve is greater than a switching pressure threshold of the third selection valve unit.

10. The hydraulic system according to claim 8, wherein the valve controls a parking lock.

11. The hydraulic system according to claim 1 further comprising five double-acting gear selectors, wherein each of the five double-acting gear selectors have two of the ten gear-selection pressure chambers.

12. The hydraulic system according to claim 1, wherein the ten gear-selection pressure chambers are divided into first gear-selection pressure chambers and second gear-selection pressure chambers and wherein the first, the second, and the third selection valve units connect the first actuation valve to the first gear-selection pressure chambers and the second actuation valve to the second gear-selection pressure chambers.

* * * * *